July 6, 1965  M. M. HANSON ETAL  3,192,892
ION BOMBARDMENT CLEANING AND COATING APPARATUS
Filed Nov. 24, 1961  2 Sheets-Sheet 1
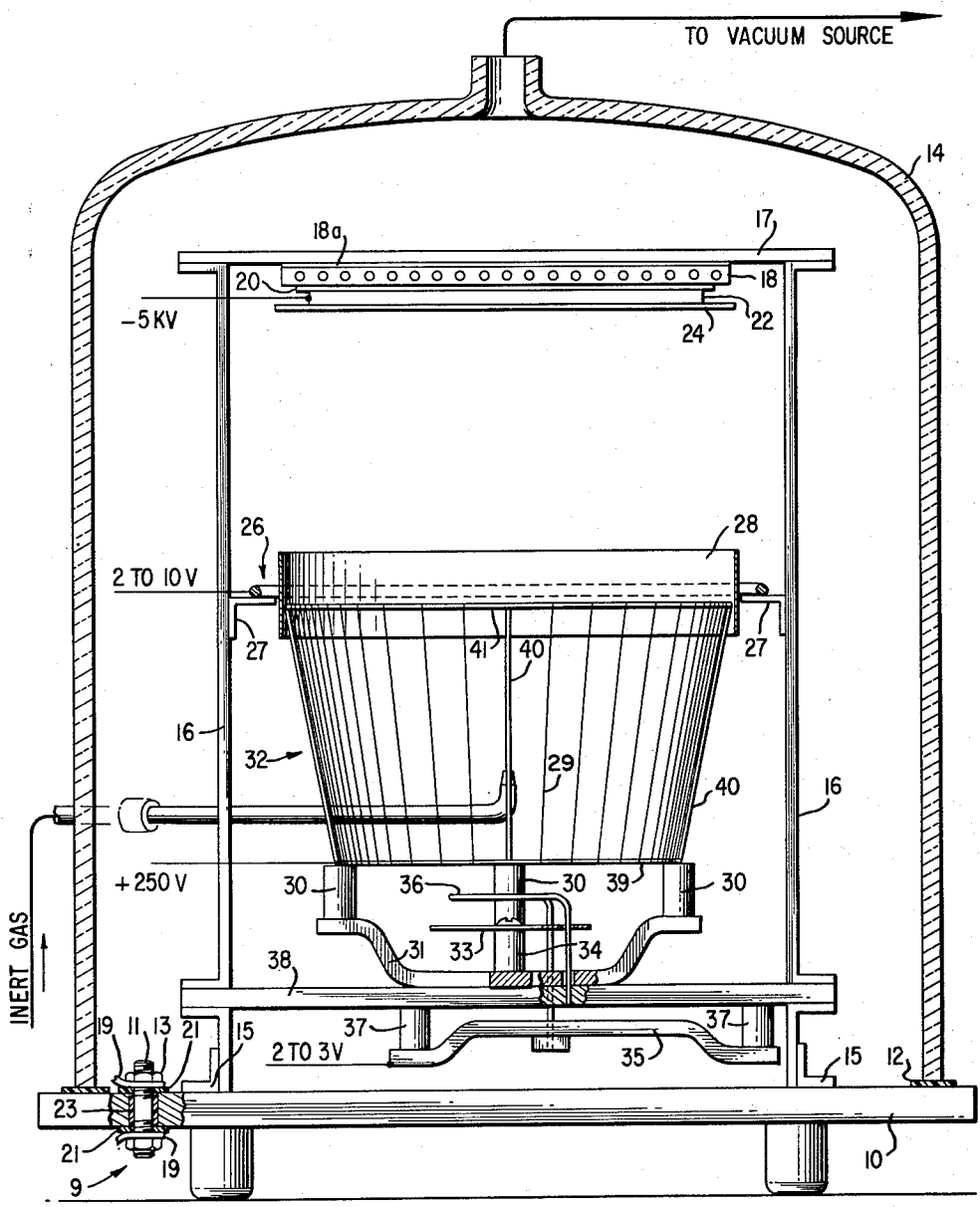
FIG.1
INVENTORS.
MARLIN M. HANSON
PAUL E. OBERG
ROBERT W. OLMEN
BY
ATTORNEY

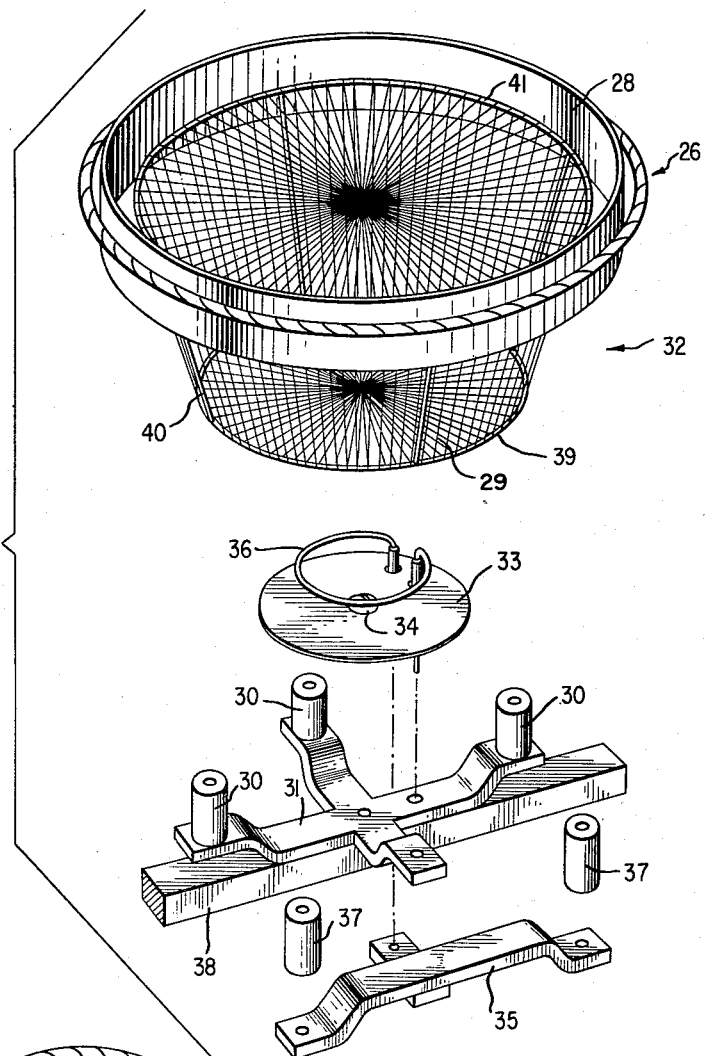
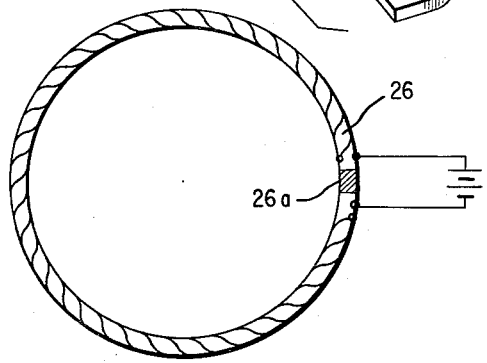

United States Patent Office 3,192,892
Patented July 6, 1965

3,192,892
ION BOMBARDMENT CLEANING AND COATING APPARATUS
Marlin M. Hanson and Paul E. Oberg, Minneapolis, and Robert W. Olmen, St. Paul, Minn., assignors to Sperry Rand Corporation, New York, N.Y., a corporation of Delaware
Filed Nov. 24, 1961, Ser. No. 154,527
14 Claims. (Cl. 118—49.1)

This invention relates to an ion bombardment apparatus and more particularly to an apparatus for generating high energy ions for bombardment of a surface to affect that surface in a variety of ways.

According to a broad aspect of this invention, there is provided within an evacuated chamber a source of electrons. By the use of a grid, hereinafter referred to as a volume-type grid, a sufficient voltage gradient is established to attract these electrons into the volume encompassed by said grid. Within the confines of said grid is an ionizable gaseous material which becomes ionized by atomic collision with said electrons. The ions thus formed are positively charged and are attracted to a relatively high, negatively charged target in the form of a substrate material to be treated by said ions. In one embodiment of the invention, the high energy gaseous ions are caused to collide with evaporant particles generated within the chamber, said particles having their energy increased thereby. The evaporant particles may have metallic or non-metallic properties and are directed to said substrate material to form a coating thereon.

The apparatus of this invention finds particular utility in the forming and processing of thin magnetic films. Said apparatus is designed to clean said substrate, that is, to remove from said substrate fine particles of dust and the like. The apparatus when functioning in conjunction with evaporant particles referred to above is used to deposit a thin film on said cleaned substrate and to control, alter or modify the properties of said film so deposited.

It is therefore an object of this invention to provide ion bombardment apparatus for cleaning a substrate.

Another object of the invention is to provide such apparatus which when employed with evaporant particles as mentioned above will deposit a film on said substrate. Such an embodiment may be employed in a manner to control, alter or modify the properties of said deposited film.

It is a further object of this invention to provide such apparatus in which a volume-type grid is employed, that is, a three-dimensional grid of a porous structure offering a minimum solid surface area with which electrons attracted thereto may collide while providing, at the same time a maximum volume for encompassing the gaseous material to be ionized, said volume being characterized by equal voltage distribution therein.

These and other objects will become apparent from a more detailed description of the accompanying drawings.

In the drawings:

FIGURE 1 is a vertical plan view, partly in section, of the one form of apparatus which may be employed in accordance with the present invention;

FIGURE 2 is a view, partly diagrammatic, showing one form of means for providing an evaporant to be used in conjunction with the present invention; and FIGURE 3 is an isometric view, partly in section, of a portion of the apparatus constructed in accordance with the present invention.

Referring first to FIGURE 1, the bell jar enclosure 14 is mounted to the ground base plate 10 via the annular gasket 12. Mounted by metal straps 15 to the plate 10 are a plurality of vertical supports 16. Towards the top of the vertical supports and carried thereby is a horizontal support 17. To this latter support is insulatively mounted a substrate heater 18, the insulation being supplied by a layer of insulating material 18a. Mounted to the bottom of the heater is the substrate holder 20 which in turn holds the substrate 22. A mask 24 may be mounted to the bottom of the substrate. This substrate may be composed of either a conductive or a non-conductive material. In the particular instance of FIGURE 1 it is assumed that this substrate is a conductive material. In this event, the high negative potential (—5 kv.) may be directly applied thereto. However, if the substrate, as is the case in some instances, is essentially composed of a non-conductive material such as glass then the substrate holder and mask may be placed at the negative potential.

A source of ions used in the bombardment of the substrate when performing a substrate cleaning operation may be ionizable residual gases or introduced ionizable gases. A residual gas is one of those remaining within the system after it has been evacuated and may be one or more of the gaseous components of the atmosphere. An introduced ionizable gas may be a specific gas, preferably a heavy inert gas such as argon which is introduced into the bell jar. Such a gas is preferably inert so as to negate any possibility of a chemical reaction with the substrate and is heavy so as to increase the impact force of the ions on the substrate whereby better cleaning action is achieved. These introduced gases may be fed into the system by a valve conduit such as a glass tube schematically shown in this figure, which leads said gases through a nozzle on the end thereof into the volume-type grid.

Let it be assumed first, that a cleaning action is to be accomplished in which residual gases are employed. By any conventional means, the bell jar is evacuated to about $10^{-5}$ mm. of mercury. Current is allowed to flow through the electron emitting filament 36. The electrons thus emitted are attracted and accelerated by the volume-type grid 32 which is at a positive potential such as about 250 volts. The grid traps the electrons within the volume and they proceed to migrate toward the grid wires. In so doing they collide with molecules of the residual gases and ionize the same, changing them to positively charged residual gas particles. The ions so formed are attracted to the substrate 22 by the —5 kv. potential thereon. They bombard the surface of the substrate, dislodging dirt and the like to render it clean.

It is seen that various potentials are applied to the numerous elements within the bell jar enclosure. Such potentials are applied by a feed-through technique. Note the arrangement 9 in the base plate 10 including bolt 11, nut 13, connectors 19, gaskets 21 and bakelite sleeve 23. This arrangement is used as desired to introduce proper potentials to the elements of the system, assuring, of course, proper insulation from the grounded base plate 10. It is well within the skill of a worker in this art to arrange the proper feed-through connections to the various elements within the bell jar enclosure.

When the apparatus is used to deposit thin films on the substrate, the material to be deposited may be introduced into the system by an evaporation process. In a preferred embodiment the material is metallic in nature; however, non-metallic evaporants such as silicon monoxide may be used as well.

In the embodiment shown a ring-type evaporation source 26 is insulatively mounted by studs 27 to a vertical support 16. However, it is not beyond the scope of this invention to replace this evaporation source with a suitable substitute. A point source such as a crucible or the like would prove particularly valuable when working with non-metallic evaporants. The ring 26 is mounted circumferentially around the annular shield 28 (FIGURE 1) and may be a solid cylindrical tungsten member. Its ends are separated by small insulator $26_a$. A source of current shown here schematically as a battery is applied to the ring as shown to provide low voltage and high current for heating purposes. Spirally wound about the ring 26 is a wire in electrical contact with said ring. This wire may be an alloy such as Permalloy or the like, which upon evaporation yields nickel-iron vapors which are particularly suitable for producing bistable thin magnetic films. However, this should not be considered a limitation as any metal may be employed. When current flows through the ring 26 is becomes heated and this head, together with the substantial vacuum within the bell jar enclosure, causes the metal of the wire to evaporate. As the evaporant particles migrate into the path of the fast moving high energy ions produced by the arrangement previously described, they are struck by the ionized gas particles and their energy is increased thereby. They are directed to the negatively charged substrate and upon impingement on the surface of the substrate provide a surface coating thereon. The addition of energy to the evaporant particles by the collision thereof with the ionized gas particles adds energy to the deposition material and may cause a more homogeneous thin film formation on the substrate. Also a better bonding of the deposit to the substrate may result from this increased energy. The evaporant metal particles may themselves be ionized by placing a positive charge on the ring source therefor.

In the alternative embodiment which utilizes a crucible as an evaporation source, the source would be positioned beneath the grid so that the ascending evaporant would pass into the grid volume and be ionized by the primary electrons within the grid structure. After being positively charged by electron bombardment within the confines of the grid, the charged evaporant would then be attracted to the negatively charged target.

After sufficient deposition of the metal evaporant upon the substrate, said deposition may be terminated by stopping the heating current through the ring 26. The bombardment of the thin film on the substrate by the ionized gas may be continued. Such a further bombardment may alter the physical, magnetic or other properties of the thin film thus formed. The film may undergo a chemical change or the crystalline structure of the film may be modified. For example, the actual physical thickness of the deposited thin film can be altered by this particular method of ion bombardment. When particles of sufficiently high energy strike the thin film, single atoms or groups of atoms can be sputtered from the film. In a specific example, let it be assumed that a thin film of Permalloy (83% nickel -17% iron) has been deposited on the substrate. Such a film possesses a magnetic property $\lambda$ known as the magneto-elastic strain coefficient. This coefficient is a function of the composite of the film. This coefficient can be either positive or negative; a positive $\lambda$ would indicate an iron-rich film greater than 17% and when this film is placed in a magnetic field, a strain would be placed upon the film and substrate due to the change in dimensions of the film. A film with a $\lambda$ of zero value is usually desired. When a thin film of Permalloy is bombarded so that the atoms are sputtered from it, it is possible that either iron or nickel atoms will be preferentially sputtered off, thereby providing a tool to help control this parameter of thin magnetic film fabrication.

Thus far we have considered the cleaning action of the present system and also the deposition of a thin film on a substrate together with alterations in the properties of said film. Both of these considerations have been described wherein residual gases are employed as the ionizable gas. However, the technique is somewhat altered when an introduced ionizable gas is to be employed. In this event the enclosure would be evacuated until the pressure was approximately $10^{-6}$ mm. of mercury or less. All the voltages would then be applied. The gas would then be introduced via the introduction means, shown schematically, into the grid volume. The gas would be immediately ionized and accelerated in the direction of the negatively charged substrate.

Ion bombardment cleaning operates successfully in a pressure range of between $10^{-3}$ and $10^{-7}$ mm. of mercury. It should be noted in this connection that pressures less than $10^{-3}$ mm. of mercury will not support a glow discharge in the absence of a strong magnetic field. Since we are here dealing with the deposition of thin bistable magnetic films, such a magnetic field could not be tolerated. In the light of the fact that the usable pressure range for vapor deposition of thin films is about $10^{-4}$ to $10^{-8}$ mm. of mercury, it is seen that a glow discharge procedure has an inherent limitation, namely, that it cannot be employed in the usable pressure range. Therefore, if a glow discharge method were used to ionize the gas, pressures less than $10^{-3}$ mm. of mercury must be used. Then, in order to provide for vapor deposition, it would be necessary to pump down and reduce the pressure to within the allowable range for this deposition. It is possible that an impure layer would be deposited on the substrate during the pump down period between the completion of the ion scrubbing operation and the subsequent vapor evaporation. In order to eliminate this possibility it can be seen that ionic cleaning should occur within the usable pressure range for vapor deposition, thus eliminating the pump down between ionic scrubbing and vapor deposition. A glow discharge technique cannot be used but the present method can.

For a more detailed description of the volume-type grid 32 and its environment, reference is made to FIGURE 3 in conjunction with FIGURE 1. The grid is essentially composed of a three-dimensional arrangement of grid wires 29 wound about a wire supporting frame. Various frame configurations are contemplated, these being designed to properly cooperate with other structural variations. Examples of equivalent frame structures might include those having pyramidal or cylindrical shapes.

In the present embodiment, the frame is supported on insulators 30. These insulators 30 are carried by a cross-shaped support member 31 which in turn is mounted to the support member 38. This support member 38 is carried by the support member 16 and therefore is at ground potential. The shield 33 is supported from member 31 by the insulator 34. This shield may be made of any non-magnetic stainless steel and electrically floats within the apparatus since it is not electrically connected to any other member. Its purpose is to stop electrons emitted from the filament 36 which travel in a downward direction. The filament 36 has one end connected through the shield 33 to ground via the ground potential of member 38 and the other end to member 35. The member 35 is at a low positive potential such as 2 to 3 volts, being placed at such potential by a feed-through arrangement. The member 35 is supported from the member 38 by insulators 37.

In this particular embodiment, the grid structure includes two parallel ring members 39 and 41. These ring members are composed of solid non-magnetic stainless steel rods about 50 mils in diameter. The upper ring member 41 describes a circle approximately 6 inches in diameter whereas the lower member 39 describes a circle which is about 3 inches in diameter. The supporting rods 49, of which there are four shown here, are composed of the same material as the ring members and they support the rings in spaced relation in two parallel, horizontal planes spaced about 3 inches apart. The grid wires used in making up the grid are tungsten and about 3 mils in diameter. The tungsten wire is disposed about the rings in a manner that substantially results in an equal distribution of voltage potential throughout the grid area. A voltage source of +250 volts is electrically connected to the lower ring 39 via a feed-through arrangement as previously described. This connection to the ring 39 may be made in any suitable and convenient manner. The entire grid arrangement is insulatively held above the electron ring filament 36. It should also be noted that the disposition of the wire grid not only provides an equal voltage distribution but also minimizes the solid surface area with which electrons may collide. An additional attribute of this particular type of grid is the large volume it encompasses, thereby exposing a relatively large amount of residual gas particles to electron bombardment. Broadly speaking, the object of disposing the grid wires in this specific manner is to maximize the lifetime of the electrons since the amount of gas ionized is a direct function of this lifetime. Thus, it can be said that a particular grid design is optimal if (1) it has a large volume and (2) if it has a minimum solid cross-sectional area exposed to electron paths. It should be noted also that the grid would function acceptably if the horizontal wires included in the grid were removed. However, in this case the electrons emitted by the filament 36 may be attracted to the area of the solid ring 39 by virtue of its positive potential. Therefore, only a relatively small amount of residual gas within the grid volume would be ionized but a sufficient amount would still be ionized to provide a usable function. It should also be noted that the filament 36 preferably lies in a horizontal plane which is parallel to the plane containing the ring 39. It is located approximately one-fourth of an inch below the ring 39 and about one-fourth of an inch above the shield 33.

Since the foregoing specification has been primarily directed toward an embodiment relating to the preparation of bistable magnetic films wherein a magnetic field is induced to magnetically orient the films, for best results it is recommended that the apparatus be composed of non-magnetic material. However, it will be appreciated by those skilled in the art that magnetizable material may be used provided that steps are taken to avoid any adverse effect upon the deposited material. For example, the magnetizable portions of the apparatus may be located sufficiently distant from the applied magnetic field so as not to substantially interfere with or distort the applied magnetic field. Other control means may also be used, if desired.

It will also be appreciated by those skilled in the art that if the apparatus disclosed herein is to be employed in connection with the preparation of a product without regard to its magnetic properties, magnetizable material could be used in the construction of the apparatus.

Various embodiments of the present invention have been described. Other embodiments which will be clear from the teachings herein to those skilled in the art are contemplated to be within the spirit and scope of the following claims.

What is claimed is:

1. An evacuated ionization chamber for cleaning a substrate and depositing a film of metallic material thereon and for altering the characteristics of said film comprising a source of electrons disposed within said chamber, a volume-type grid, a voltage source connected between said source of electrons and said grid, said voltage source establishing a voltage gradient sufficient to attract electrons into the volume enclosed by said grid, an ionizable gaseous material disposed within the confines of said grid, said gaseous material being ionized by said electrons, a target including said substrate material, a source of target potential, said target potential establishing a voltage gradient sufficient to attract said ions to said target.

2. The apparatus recited in claim 1 wherein said volume-type grid includes a first supporting ring of non-magnetic material, a second supporting ring of non-magnetic material, a plurality of supporting rods disposed between said first and said second supporting rings to position said supporting rings in spaced relation in two parallel, horizontal planes, and grid wires disposed over said supporting rings and said supporting rods to encompass a volume of said ionizable gas.

3. The apparatus recited in claim 2 wherein said source of electrons is a heated filament disposed adjacent to and parallel with the plane of said first supporting ring, said apparatus further including a shield of non-magnetic material, said shield being positioned parallel to said first ring for inhibiting the flow of electrons in a downward direction.

4. The apparatus recited in claim 3 and an evaporation source positioned adjacent to said second supporting ring, a source of metallic material in close proximity to said evaporation source and means for selectively heating said evaporation source whereby metallic particles are evaporated from said material, said ions imparting a high energy to said metallic particles by collision therewith, said high energy metallic particles being directed to said substrate to form a film thereon.

5. The apparatus recited in claim 1 wherein residual gases in said evacuated chamber provide said ionizable gaseous material.

6. The apparatus recited in claim 1 and a gas introduction tube extending through said evacuation chamber to the volume enclosed by said grid, and means for pumping said ionizable gaseous material through said tube to the volume enclosed by said grid.

7. Ion bombardment apparatus comprising an evacuated chamber, a filamentary electron source mounted in said chamber, a shield of non-magnetic material, said shield being insulated from said source of electrons, said shield being mounted between said source of electrons and the bottom of said evacuated chamber, a first supporting ring of non-magnetic material, said first supporting ring being insulated from said source of electrons and being mounted above said source of electrons, a second supporting ring, a plurality of supporting rods disposed between said first and second supporting rings to position said supporting rings in spaced relation in two parallel, horizontal planes, grid wires disposed on each of said supporting rings and between said first and second supporting rings so as to enclose a volume defined by said supporting rings, an ionizable gaseous material disposed within said volume, a voltage source connected between said source of electrons and said supporting rings, said voltage source establishing a voltage gradient sufficient to attract electrons from said electron source into the volume defined by said supporting rings said gaseous material being ionized by said electrons, an evaporation source mounted above said second supporting ring, means for selectively heating said evaporation source to produce metallic particles, a target including a substrate, a source of target potential, said target potential establishing a voltage gradient sufficient to attract ions from the region of said enclosed volume to said target whereby said substrate is cleaned by ion bombardment and is coated with said metallic particles when said evaporation source is heated.

8. An evacuated ionization chamber for cleaning a substrate and depositing a film of material thereon and for altering the characteristics of said film comprising a source of electrons disposed within said chamber, a volume-type grid, a voltage source connected between said source of electrons and said grid, said voltage source establishing a voltage gradient sufficient to attract electrons into the volume enclosed by said grid, an ionizable gaseous material disposed within the confines of said grid, said gaseous material being ionized by said electrons, a target including said substrate material, a source of target potential, said target potential establishing a voltage gradient sufficient to attract said ions to said target.

9. An evacuated ionization chamber for cleaning a substrate comprising a source of electrons disposed within said chamber, a volume-type grid, a voltage source connected between said source of electrons and said grid, said voltage source establishing a voltage gradient sufficient to attract electrons into the volume enclosed by said grid, an ionizable gaseous material disposed within the confines of said grid, said gaseous material being ionized by said electrons, a target including said substrate material, a source of target potential, said target potential establishing a voltage gradient sufficient to attract said ions to said target.

10. In an apparatus containing a volume type grid electrically biased to attract electrons for ionizing a gaseous material disposed in the volume enclosed by the grid, said apparatus being used for depositing upon a substrate by evaporation a coating of thermally evaporable material, the improvement comprising: chamber means having a reduced internal pressure; ring shaped mounting means within the chamber mounting evaporable material; said ring shaped mounting means being disposed in proximity to the volume type grid and separated from said grid by a shielding means, and means for heating the mounting means for causing the material to evaporate therefrom, a portion of the evaporated material being ionized by said ionized gaseous material and being deposited upon said substrate.

11. In an aparatus containing a volume type grid electrically biased to attract electrons for ionizing a gaseous material disposed in the volume enclosed by the grid, said apparatus being used for depositing upon a substrate by evaporation a coating for thermally evaporable material, the improvement comprising: chamber means having a reduced internal pressure; ring means within the chamber; an evaporable material, the material being in wire form and helically wound upon the ring means; said ring shaped mounting means being disposed in proximity to the volume type grid and being separated from said grid by a shielding means, and means for heating the ring means for causing the material to evaporate therefrom.

12. Apparatus as in claim 11 wherein the ring means is a tungsten wire.

13. The apparatus recited in claim 1 wherein said volume-type grid includes first and second supporting rings disposed in spaced relation in two substantially parallel planes and grid wires disposed over said supporting rings to encompass a volume of said ionizable gas.

14. In an apparatus for evaporatively depositing a thermally evaporable material on a substrate, the improvement comprising: chamber means having a reduced internal pressure; a source of electrons disposed within said chamber; a volume-type grid; a voltage source connected between said source of electrons and said grid, said voltage source establishing a voltage gradient sufficient to attract electrons into the volume defined by said grid; an evaporation source disposed within said chamber means and mounting evaporable material; means for heating said evaporation source for causing said material to evaporate, the evaporant particles being caused to enter the volume defined by the grid, said evaporant particles being ionized within said volume by said electrons; a target including a substrate; and a source of target potential, said target potential establishing a voltage gradient sufficient to attract said ionized evaporant particles to said target.

References Cited by the Examiner

UNITED STATES PATENTS

| | | | |
|---|---|---|---|
| 2,067,907 | 1/37 | Edwards | 118—49 X |
| 2,501,563 | 3/50 | Colbert et al. | 117—93.1 X |
| 2,660,540 | 11/53 | Karash et al. | 117—107 X |
| 2,985,756 | 5/61 | Holland | 117—54 X |
| 3,033,701 | 5/62 | Wozniak | 117—47 X |

OTHER REFERENCES

Holland: "Vacuum Deposition of Thin Films" (1956), New York, John Wiley & Sons. TS 695 H 6 (pages 104, 118 to 120, 141 to 161).

CHARLES A. WILLMUTH, *Primary Examiner.*

RICHARD D. NEVIUS, *Examiner.*